United States Patent Office 3,014,006
Patented Dec. 19, 1961

3,014,006
COMPOSITION OF HALOGENATED BUTYL RUBBER AND A METHYLOL-FREE POLYHYDRIC PHENOL, METHOD OF CURING SAME AND VULCANIZATE THEREOF
David Wasserman, Springfield, and Warren P. Swett, Scotch Plains, N.J., assignors to Minnesota Mining and Manufacturing Company, St. Paul, Minn., a corporation of Delaware
No Drawing. Filed Dec. 24, 1958, Ser. No. 782,618
14 Claims. (Cl. 260—43)

This invention relates to novel compositions of matter and to methods of preparing them. More particularly, this invention is directed to compositions, including as a component, one or a combination of two or more halogen containing butyl rubbers, which hereafter shall be referred to as halo-butyl rubber. In one of its more specific aspects, the invention is directed to Materials (I), namely, halo-butyl rubber and a heavy metal oxide, together with Material (II) hereinafter described. Such Materials (I) and (II) may be intimately combined with each other in the presence of (III) another curing agent, such as one or a combination of two or more heavy metal oxides, examples of which are the oxides of metals, such as tin, iron, manganese, lead, cobalt, zinc, nickel, cadmium, aluminum, etc., and also in the presence or absence of fillers such as carbon black and other materials such as stearic acid, etc., may be vulcanized to provide improved vulcanizates. We have discovered that by employing both (II) and (III) in combination with (I), said (II) and (III) act synergistically to unexpectedly effectively cure said (I) when subjected to common curing procedure.

The term "vulcanization" as employed herein is used in its commonly accepted sense and has reference to the process for converting Materials (I) from the raw state in which they are weak materials having the typical properties of a plastic gum into a strong non-plastic typically elastic material. Unvulcanized or uncured Materials (I) like other elastomers have no definite elastic limit, that is, upon slow application of tensile stress, they elongate or string out almost indefinitely without breaking and exhibit very little, if any, elastic recovery after the stress is removed. On the other hand, vulcanized or cured, Materials (I) according to this invention, in common with other typical elastomers have definite elastic limits, as well as ability to return to substantially their original length after being stretched, that is, they exhibit high elastic recovery.

Butyl rubber is a well-known commercial synthetic rubber made by copolymerizing an isoolefin, usually isobutylene, with a minor proportion of a conjugated diolefin, usually isopren or butadiene. The isoolefins used generally have from 4 to 7 carbon atoms, and such isomonoolefins as isobutylene or ethyl methyl ethylene are preferred. The diolefins employed usually are ordinary open-chain conjugated diolefins having from 4 to 8 carbon atoms, among which may be mentioned, in addition to the commonly used isoprene or butadiene, such compounds as piperylene; 2,3-dimethyl-1,3-butadiene; 3-methyl-1,3-pentadiene; 2-methyl-1,3-pentadiene; 1,3-hexadiene; and 2,4-hexadiene. The butyl rubber contains only relatively small amounts of copolymerized diene, typically from about 0.5 to 5%, and seldom more than 10%, on the total weight of the elastomer. For the sake of convenience and brevity, the various possible synthetic rubbers within this class will be designated generally by the term butyl rubber.

The Materials (I), namely, halo-butyl rubber are such butyl rubber modified with halogen and differ therefrom substantially only in that the butyl rubber contains one or more halogens, by addition at double bonds and/or substitution for hydrogen of the hydro-carbon groups. In general, the quantity of halogen contained in Materials (I) measures at least about 0.5% and generally 1 to 10% by weight thereof.

The Materials (II) employed in the practice of this invention are aldehyde-reactive polyhydric phenols, that is, polyhydric phenols which are capable of reaction with an aldehyde such as formaldehyde in the presence of a catalyst which may be either acidic or alkaline. By the term "polyhydric phenols" we mean those compounds having more than one phenolic hydroxyl group per molecule. Examples of some of them are mononuclear polyhydric phenols such as, 5-n-pentadecyl resorcinol, resorcinol, catechol, hydroquinone, methyl resorcinol, etc. and polynuclear phenols such as 2,2-bis-(4'-hydroxy phenyl) propane, known on the market as "Bisphenol A," 4,4'-dihydroxy benzophenone, bis-(4-hydroxy phenyl) methane, 1,1-bis-(4-hydroxy phenyl) ethane, 1,1-bis-(4-hydroxy-2-tertiary butyl phenyl) propane, 2,2-bis-(2-hydroxy naphthyl) pentane, 1,5-dihydroxy naphthalene, etc., as well as such polyhydric phenols obtained by reacting a material selected from the class of hydroxybenzene, naphthol, anthranol, and homologues thereof with a phenol having an unsaturated hydrocarbon substituent on its ring nucleus, such reaction products and the methods for making them being disclosed in the U.S. patent to M. T. Harvey, 2,317,607 issued on April 27, 1943 and in the U.S. patent to D. Wasserman 2,665,266 issued on January 5, 1954. Still other examples of such polyhydric phenols are the well-known novolac resins which, as is well known to the art, are obtained by the condensation of a phenol with an aldehyde in the presence of an acidic condensing catalyst. Still other examples of such polyhydric phenols are the normally liquid polymers obtained by polymerizing phenols having unsaturated side chain substituents on the nucleus such as materials of the kind obtained or derived from the Anacardiaceae family. Still other examples of such polyhydric phenols are the fusible resins obtained by reacting 3-pentadecyl phenol with formaldehyde in the presence of ammonia as the catalyst. All of said Materials (II) employed in the practice of this invention are polyhydric phenols free of methylol groups and consequently cannot be homopolymerized or homoreacted through a mechanism involving methylol condensations.

The following are specific examples of some of the 3-pentadecyl phenol-formaldehyde organic reaction products which are other examples of polyhydric phenols, namely, Materials (II) and may be produced by employing the following methods:

EXAMPLE X 300 grams of 3-pentadecyl phenol, 33 grams paraformaldehyde and 25 cc. of an aqueous solution of ammonia (28% concentration) were charged into a glass vessel which had a reflux condenser coupled therewith together with a stirrer therein. While constantly stirred, the mass in said vessel was heated to 100° C. and maintained at that temperature for a period of approximately 90 minutes.

In the course of the first 45 minutes of said 90 minute period, crystals began to appear and appeared to continuously form during the next 45 minutes of said 90-minute period. At the end of that period, the source of heat was removed and while still hot, there was added to said mass 600 cc. of acetone which was mixed with the reaction mass in said vessel. This entire mass was now allowed to cool to room temperature and then filtered, and the crystalline mass on the filter paper was washed with acetone and the wash-filtrate was charged into the original filtrate. The material on said filter paper, which was insoluble in both hot and cold acetone, measured 51 grams and had a melting point of about 150° C. and is hereinafter known as Product X. The filtrate was placed under vacuum and was heated to a temperature of 100° C. to remove acetone and water and the resultant product is hereinafter known as Product XX.

EXAMPLE Y 1100 grams of 3-pentadecyl phenol, 100 grams of 5-pentadecyl resorcinol, 145 grams of paraformaldehyde and 40 grams of an aqueous solution of ammonia (28% concentration) were charged into a glass reaction vessel having a stirrer therein and connected to a reflux condenser. While being constantly stirred, the mass was heated to a temperature of approximately 200° F. and maintained at that temperature for about 90 minutes. Then vacuum was applied and the mass heated to a temperature of 230° F. to effect substantially complete dehydration, after which the mass was cooled to room temperature and is hereinafter known as Product Y.

EXAMPLE Z 600 grams of 3-pentadecyl-phenol, 46 grams of paraformaldehyde and 60 grams of an aqueous solution of ammonia (28% concentration) were charged into a glass reaction vessel with a stirrer and having a reflux condenser attached thereto. The mass was heated to a temperature of approximately 200° F. and maintained at that temperature for a period of approximately 90 minutes. After 45 minutes of said 90-minute period, some crystallization occurred and appeared to continue to form over the next 45 minutes. The source of heat was removed at the end of said 90-minute period and there was now added to said mass while still hot, 400 cc. of toluene. The water contained therein was removed azeotropically and when anhydrous, the toluene was removed from said mass while heating to a temperature of approximately 225° F. The vacuum was continuously increased in the course of said heating until it reached the value of about 5 mm. of mercury pressure. The material was cooled to room temperature and was found to be a substantially solid orange colored mass containing finely divided crystals therein and such product is hereinafter known as Product Z.

EXAMPLE W 600 grams of 3-pentadecyl phenol, 50 grams of paraformaldehyde and 5 cc. of hydrochloric acid (37% concentration) were charged into a glass vessel equipped with a stirrer and connected to a reflux condenser. The mass was heated to a temperature of approximately 100° C. and maintained at that temperature for a period of approximately 90 minutes. Then the mass was heated under vacuum to a temperature of approximately 120° C. whereby the mass became substantially completely dehydrated. This mass is hereinafter known as Product W.

EXAMPLE V 150 grams of 3-pentadecyl phenol 19 grams of paraformaldehyde and 4 grams of an aqueous solution of sodium hydroxide (50% concentration) were charged into a glass reaction vessel having a stirrer and coupled with a reflux condenser. The mass was heated to approximately 200° F. and maintained at that temperature for 90 minutes. Then it was neutralized with 3.6 cc. of hydrochloric acid (37% concentration) and dehydrated under vacuum to a temperature of approximately 120° C. This mass is hereinafter known as Product V.

Prior to this invention, the halo-butyl rubbers, namely, Materials (I) had been vulcanized by using a combination of sulfur and zinc oxide as the vulcanizing agent. While such combination would cause vulcanization of Materials (I), the resulting vulcanizates were not completely satisfactory for certain purposes for the reasons that they showed poor aging at elevated temperatures as evidenced by their having become brittle when maintained for certain periods of time at elevated temperatures and consequently were characterized by poor heat aging property; secondly, such vulcanizates were found to be unsatisfactory as electrical insulating materials due to the presence of sulfur therein which caused corrosion of the conductor; thirdly, they had a poor adhesion to cord and especially to such cords employed in the manufacture of tires.

We have discovered that Materials (I) and (II) when compounded together with a curing agent, namely, a heavy metal oxide, such as zinc oxide for example, in the absence of sulfur did provide stocks which were capable of being vulcanized unexpectedly to provide vulcanization which unexpectedly have substantially all of the desirable characteristics of the vulcanizates produced by vulcanizing the prior art combinations consisting of Material (I) with sulfur and zinc oxide, but without the undesirable characteristics thereof. As distinguished from such prior art vulcanizates, the vulcanizates of the present invention have good heat aging characteristics, may be employed as electrical insulation without any appreciable danger of corroding the conductor and have good adhesion to cords and especially to cords of the type employed in the manufacture of tires.

According to this invention, any of Materials (I), any of said oxide curing agents (III) and any of Materials (II) may be combined in various proportions depending upon the specific characteristics, such as the tensile strength, the modulus of elasticity, rigidity, etc. desired in the final stock after vulcanization. In general, we prefer that the ratio by weight of Material (II) to Material (I) be at least approximately two parts of Material (II) to 100 parts of Material (I). For many purposes, the ratio by weight of (II) to (I) is in the range of approximately 2–25 parts of (II) to 100 parts of (I). To such combination of (I) and (II) is added an appropriate quantity of Material (III) which in general measures approximately 2–10 parts thereof for each 100 parts of (I). The Material (III) component is intimately combined and substantially uniformly dispersed throughout said combination of (I) and (II) to provide a stock which is ready for curing at elevated temperatures. Instead of first combining (I) and (II), all 3 components, namely, Materials (I), (II) and a curing agent, Material (III), may be all milled together to provide such stock. However produced, such stock is subjected to the common cure treatment, which in general, is maintaining it at approximately 290° F. to 350° F. from approximately 15 minutes to one hour to effectuate vulcanization or curing.

Said Material (III) is one or a combination of two or more heavy metal oxides, examples of which have been hereinbefore set forth.

The following Examples 1–20 are given by way of illustration, and not limitation, of various formulations which may be employed to provide novel stocks which may be cured to produce novel vulcanizates, all parts being given by weight, unless otherwise specified.

*Examples 1–11*

100 parts Material (IA) "Hycar 2202" (bromine containing butyl rubber disclosed in Wire and Wire Products, July 1955 issue), 50 parts "Philblack O" (carbon black), 0.5 part stearic acid, 5 parts of zinc oxide and 5 parts of the respective polyhydric phenols (1) Product II disclosed in Example 2 of Wasserman U.S. Patent 2,665,266, (2) polymerized cashew nut shell liquid disclosed in Example 2 of the S. Caplan et al. U.S. Patent 2,338,230 and having a viscosity such that when dissolved in an equal weight of xylene, the viscosity of said solution at 25° C. is approximately 150 centipoises, (3) Product V, (4) Product W, (5) Product X, (6) Product XX, (7) Product Z, (8) 5-n-pentadecyl resorcinol, (9) resorcinol, (10) "bis phenol A," and (11) Product Z, where milled together on a rubber mill to provide individual compositions which were substantially uniform throughout and which are hereinafter known as stocks 1–11 respectively. Said stocks 1–2 respectively were placed in molds and kept for 60 minutes in a press maintained at 330° F. At the end of that period said stocks were removed from their molds and were found to be cured and such cured stocks 1–2 respectively are hereinafter known as vulcanizates 1–2 respectively. Said stocks 3–7 respectively were placed in molds and kept for 60 minutes in an oven maintained at 310° F. At the end of that period, said stocks were removed from their molds and were found to be cured and such cured stocks 3–7 respectively are hereinafter known as vulcanizates 3–7 respectively. Said stocks 8–11 were cured for 60 minutes at 310° F. to provide cured stocks 8–11 respectively hereinafter known as vulcanizates 8–11 respectively.

Control example 100 parts of Material (IA), 50 parts "Philblack O," 0.5 part stearic acid, and 5 parts of zinc oxide were milled together on a rubber mill until uniform throughout and this stock was placed in a mold kept for 30 minutes in a press maintained at 330° F. At the end of that period, this stock was removed from the mold. There was obtained a control vulcanizate hereinafter known as vulcanizate C–IA.

Examples 12–19

100 parts of Material (IB) known as "ENJ–B–11" and being chlorine containing butyl rubber, with the chlorine content thereof being in the approximate range of 1 to 1.5%, 50 parts of "Philblack O" (carbon black), 0.5 part of stearic acid, 5 parts of zinc oxide and 5 parts respectively of (12) 5-pentadecyl, resorcinol, (13) "bis phenol A" hereinbefore disclosed, (14) Product II of Example 2 of Wasserman U.S. Patent 2,665,266, (15) polymerized cashew nut shell liquid disclosed in Example 2 of Caplan et al. U.S. Patent 2,338,230 and being of such viscosity that when a sample thereof dissolved in an equal weight of xylene, the viscosity of such solution at 25° C. is about 150 centipoises, (16) Product Z, (17) Product X, (18) Product XX, and (19) Product Y were milled together on a rubber mill to provide individual compositions which were substantially uniform throughout and which are hereinafter known as stocks 12–19 respectively. Said stocks 12–16 respectively were placed in molds and kept for 30 minutes in a press maintained at 330° F. At the end of that period, said stocks were removed from their molds and were found to be cured and such cured stocks 12–16 respectively are hereinafter known as vulcanizates 12–16 respectively. Said stocks 17–19 were placed in molds and kept for 60 minutes in oven maintained at 307° F. At the end of that period, said stocks were removed from their molds and were found to be cured and such cured stocks 17–19 respectively are hereinafter known as vulcanizates 17–19 respectively.

Control example 100 parts of Material (IB), 50 parts of "Philblack O" (carbon black), 0.5 part stearic acid and 5 parts of zinc oxide were milled together on a rubber mill to provide composition substantially uniform throughout and which is hereinafter known as a control stock. This control stock was placed in a mold and kept for 30 minutes in a press maintained at 330° F. At the end of that period, the stock was removed from the mold and was found to be cured and such cured control stock is hereinafter known as vulcanizate C–IB.

Said novel vulcanizates 1–19 and the control vulcanizates C–IA and C–IB were subjected to various tests at room temperature and the following results were obtained as shown in the following table:

| Vulcanizates | Modulus | | Tensile | Elongation | Shore "A" hardness | Percent set at break |
|---|---|---|---|---|---|---|
| | 200% | 300% | | | | |
| 1 | | | 1,860 | 300 | 66 | |
| 2 | | 1,430 | 1,630 | 335 | 67 | |
| 3 | 530 | 1,000 | 1,900 | 490 | 53 | 18.7 |
| 4 | 600 | 1,180 | 2,070 | 450 | 53 | 12.5 |
| 5 | | | 2,000 | 200 | 66 | 0.0 |
| 6 | 1,430 | | 2,030 | 260 | 63 | 6.2 |
| 7 | 1,360 | | 2,230 | 300 | 60 | 3.1 |
| 8 | | 1,476 | 2,168 | 410 | 63 | |
| 9 | | 1,507 | 1,649 | 320 | 65 | |
| 10 | | 810 | 1,422 | 455 | 66 | |
| 11 | | 1,766 | 1,824 | 315 | 67 | |
| C–IA | | 708 | 998 | 445 | 65 | |
| 12 | | 1,460 | 2,190 | 440 | 52 | 3.1 |
| 13 | | 810 | 1,715 | 505 | 54 | 6.2 |
| 14 | | 1,210 | 1,890 | 445 | 55 | |
| 15 | | 1,225 | 1,675 | 410 | 56 | |
| 16 | | 1,320 | 2,255 | 465 | 55 | 3.1 |
| 17 | 950 | 1,800 | 2,000 | 330 | 55 | |
| 18 | 850 | 1,625 | 1,990 | 380 | 51 | |
| 19 | 700 | 1,400 | 2,000 | 400 | 51 | |
| C–IB | | 570 | 875 | 455 | 55 | 8.0 |

A comparison of the results obtained and recorded in the foregoing table establishes that the employment of the various Materials (II) and (III) in the stock, when subsequenty cured imparts to the vulcanizate an unexpected combination of properties, namely, appreciable increase of the 300% modulus and tensile strength, without appreciable reduction of elongation or appreciable increase of "Shore A" hardness due to the synergistic action of Materials (II) and (III) employed.

Since certain changes in carrying out the above process and certain modifications in the compositions embodying the invention may be made without departing from its scope, it is intended that all matter contained in the above description shall be interpreted as illustrative and not in a limiting sense. It is also to be understood that other materials may be added to our novel compositions of matter herein claimed without departing from the spirit of the invention. Particularly, it is to be understood that in said claims, ingredients or components recited in the singular are intended to include compatible mixtures of said ingredients wherever the sense permits.

This application is a continuation-in-part of our co-pending application 678,438 of August 15, 1957, now abandoned.

We claim:

1. A novel composition of matter comprising an aldehyde-reactive methylol-free, polyhydric phenol intimately combined with a heavy metal oxide and a halogen containing rubbery copolymer of an isoolefin having from 4–7 carbon atoms with from 0.5–10% of a conjugated diolefin having from 4–8 carbon atoms.

2. A vulcanizate produced by heating a composition defined in claim 1.

3. A vulcanizate produced by heating a composition comprising an aldehyde-reactive methylol-free, polyhydric phenol, a heavy metal oxide and a halogen containing rubbery copolymer of an isoolefin having from 4–7 carbon atoms with from 0.5–10% of a conjugated diolefin having from 4–8 carbon atoms, the ratio by weight of said phenol to said copolymer being at least 2 to 100.

4. A vulcanizate produced by heating a composition comprising an aldehyde-reactive methylol-free, polyhydric phenol, zinc oxide and a halogen containing rubbery copolymer of an isoolefin having from 4–7 carbon atoms with from 0.5–10% of a conjugated diolefin having from 4–8 carbon atoms.

5. A novel composition of matter comprising an aldehyde reactive methylol-free, polyhydric phenol intimately combined with a heavy metal oxide and a bromine containing rubbery copolymer of an isoolefin having from 4–7 carbon atoms with from 0.5–10% of a conjugated diolefin having from 4–8 carbon atoms.

6. A novel composition of matter comprising an aldehyde reactive methylol-free, polyhydric phenol intimately combined with a heavy metal oxide and a chlorine containing rubbery copolymer of an isoolefin having from 4–7 carbon atoms with from 0.5–10% of a conjugated diolefin having from 4–8 carbon atoms.

7. A vulcanizate produced by heating a composition comprising an aldehyde-reactive methylol-free, polyhydric phenol, zinc oxide and a bromine containing rubbery copolymer of an isoolefin having from 4–7 carbon atoms with from 0.5–10% of a conjugated diolefin having from 4–8 carbon atoms.

8. A vulcanizate produced by heating a composition comprising an aldehyde-reactive methylol-free, polyhydric phenol, zinc oxide and a chlorine containing rubbery copolymer of an isoolefin having from 4–7 carbon atoms with from 0.5–10% of a conjugated diolefin having from 4–8 carbon atoms.

9. The method comprising heat curing an intimate combination comprising an aldehyde-reactive methylol-free, polyhydric phenol intimately combined with a heavy metal oxide and a halogen containing rubbery copolymer of an isoolefin having from 4–7 carbon atoms with from 0.5–10% of a conjugated diolefin having from 4–8 carbon atoms, the ratio by weight of said phenol to said copolymer being 2 to 25 parts of said phenol to 100 parts of said copolymer.

10. The method comprising heat curing a combination comprising an aldehyde-reactive methylol-free, polyhydric phenol, zinc oxide and a halogen containing rubbery copolymer of an isoolefin having from 4–7 carbon atoms with from 0.5–10% of a conjugated diolefin having from 4–8 carbon atoms.

11. A novel composition of matter as defined in claim 1, with said phenol being organic reaction product produced by reacting, in the presence of a cationic condensing agent, hydroxybenzene and, a phenol having an unsaturated hydrocarbon substituent on the nucleus thereof.

12. A vulcanizate as defined in claim 3, with said phenol being organic reaction product produced by reacting, in the presence of a cationic condensing agent, hydroxy-benzene and, a phenol having an unsaturated hydrocarbon substituent on the nucleus thereof.

13. A novel composition of matter as defined in claim 1, with said phenol being a 3-pentadecyl phenol-formaldehyde organic reaction product.

14. A vulcanizate as defined in claim 3 with said phenol being a 3-pentadecyl phenol-formaldehyde organic reaction product.

References Cited in the file of this patent

UNITED STATES PATENTS

| | | |
|---|---|---|
| 2,631,984 | Crawford | Mar. 17, 1953 |
| 2,701,895 | Tawney et al. | Feb. 15, 1955 |
| 2,720,479 | Crawford et al. | Oct. 11, 1955 |
| 2,732,354 | Morrissey et al. | Jan. 24, 1956 |
| 2,926,718 | Baldwin et al. | Mar. 1, 1960 |